United States Patent
Heim et al.

(10) Patent No.: US 12,070,872 B2
(45) Date of Patent: Aug. 27, 2024

(54) METHOD FOR FOAMING CHIPBOARDS WITH TUBES AND A CHIPBOARD WITH TUBES

(71) Applicant: SAUERLÄNDER SPANPLATTEN GMBH & CO. KG, Arnsberg (DE)

(72) Inventors: Sebastian Heim, Gotha (DE); Steffen Donath, Gotha (DE); Lars Kloeser, Arnsberg (DE)

(73) Assignee: SAUERLÄNDER SPANPLATTEN GMBH & CO. KG, Arnsberg (DE)

( * ) Notice: Subject to any disclaimer, the term of this patent is extended or adjusted under 35 U.S.C. 154(b) by 0 days.

(21) Appl. No.: 17/587,010

(22) Filed: Jan. 28, 2022

(65) Prior Publication Data

US 2022/0234244 A1 Jul. 28, 2022

(30) Foreign Application Priority Data

Jan. 28, 2021 (EP) ..................................... 21154104

(51) Int. Cl.
| | |
|---|---|
| B27M 1/08 | (2006.01) |
| B27N 3/00 | (2006.01) |
| B27N 7/00 | (2006.01) |
| B29C 44/18 | (2006.01) |
| B29C 70/74 | (2006.01) |
| E04C 2/24 | (2006.01) |

(52) U.S. Cl.
CPC .............. *B27N 3/005* (2013.01); *B27M 1/08* (2013.01); *B27N 7/00* (2013.01); *B29C 44/18* (2013.01); *B29C 44/186* (2013.01); *B29C 70/747* (2013.01); *E04C 2/243* (2013.01)

(58) Field of Classification Search
None
See application file for complete search history.

(56) References Cited

FOREIGN PATENT DOCUMENTS

| CN | 107939249 A | * | 4/2018 | ............. E05C 17/56 |
| DE | 202016101223 U1 | * | 6/2017 | ........... E06B 3/5892 |

(Continued)

OTHER PUBLICATIONS

Wassner EP0141368 1985 English Translation (Year: 1985).*
Schmid DE202016101223U1 2017 English Translation (Year: 2017).*
Chen 107939249A 2018 English Translation (Year: 2018).*

*Primary Examiner* — Jacob T Minskey
*Assistant Examiner* — Adrien J Bernard
(74) *Attorney, Agent, or Firm* — Bachman & LaPointe, P.C.

(57) ABSTRACT

The invention relates to a method for foaming chipboard with tubes including a board body interspersed by tubes and having an upper and a lower face includes the steps of
   providing a corresponding chipboard with tubes,
   defining one or more machining regions on the upper and/or lower face of the chipboard with tubes,
   machining the machining regions.
In order to provide a method for foaming chipboard with tubes and a chipboard with tubes having foamed tubes that can be used in a simple, flexible, and cost-effective manner while also being highly robust, a foam-forming material is introduced at least in portions of at least one of the above-mentioned tubes in the machining region in order to locally reduce the difference in density between the tubes and the board body. The invention further relates to the use of a device for foaming tubes of a chipboard with tubes.

9 Claims, 4 Drawing Sheets

(56) References Cited

FOREIGN PATENT DOCUMENTS

| EP | 0141368 A2 | 5/1985 |
|----|------------|--------|
| WO | 2004024411 A1 | 3/2004 |
| WO | 2010079203 A2 | 7/2010 |

\* cited by examiner

METHOD FOR FOAMING CHIPBOARDS WITH TUBES AND A CHIPBOARD WITH TUBES

BACKGROUND OF THE INVENTION

The invention relates to a method for foaming chipboard with tubes and to a chipboard with tubes comprising tubes that are foamed at least in portions.

Chipboards with tubes with a filled tube are known, for example, from DE 28 23 053. They substantially consist of a central layer of lignocellulosic particles, usually wood chips, which are mixed with binder and which are extruded in the shape of a beam and finally covered with an outer layer consisting, for example, of natural wood boards. It is also disclosed that it is possible to arrange a continuous cavity in the central layer.

Furthermore, the possibility of filling or foaming said cavity with an insulating material is also disclosed. Chipboard with tubes without an outer layer and foamed tubes are used, for example, in the manufacture of wall elements or doors, usually as the core of the door leaf. Said door leaf core can then be provided with veneers or decorative paper on the visible surfaces in order, for example, to create a natural wood look or to imitate wood grain.

Furthermore, EP 0 141 368 A2 describes a door leaf comprising a chipboard with tubes with essentially horizontal tubes. The door leaf is intended to be particularly burglar-proof and fire-resistant. Therefore, metal rods are embedded in at least a part of the tubes. The metal rods have a smaller diameter than the tubes themselves. Therefore, it is taught to fill the remaining cavity of each tube with a material that has fire-retardant properties.

In this context, the fire retardant may be a material which foams when exposed to heat. Furthermore, the tubes shall be closed at their open ends by means of a metal frame surrounding the door leaf. Hard fibre layers are applied to the visible surfaces of the chipboard with tubes.

Chipboard with tubes of the known type have a low wall thickness in the region of the tubes and thus a low strength. If, for example, profiles are also provided in the surface of the chipboard with tubes, e.g. for country house door leaves, or if cutouts passing through the chipboard with tubes are provided for shaping a door leaf or a wall element, this sometimes creates stability problems on the surface of the chipboard with tubes or in the edge region of such a cutout. The cutout often cuts through one or more tubes in the edge region, such that concavely formed cavities are exposed there or tubes are cut. The wall portions are thin in this edge region and thus unstable. The same applies to the profiling of the surface in the thin wall portions above a tube. Therefore, such machining operations on a chipboard with tubes have not been economically feasible thus far.

SUMMARY OF THE INVENTION

The object of the invention is therefore to provide a method and a chipboard with tubes by means of which the possibility of surface machining is improved in a cost-effective manner.

The invention solves the object with a method as disclosed herein and with a chipboard with tubes also as disclosed herein. The dependent claims refer to advantageous embodiments.

The method according to the invention relates to the foaming of chipboard with tubes comprising a board body traversed by tubes and having surfaces, namely an upper and lower face. In one step of the method according to the invention, a chipboard with tubes is provided. Various manufacturing methods are known from the prior art for producing chipboard with tubes of this kind, for example the Okal method and/or the Globiboard method.

In a following step, one or more machining regions are defined on the upper and/or lower face of the chipboard with tubes. Within the context of the invention, the definition of a machining region should be understood to mean designating a region of the chipboard with tubes in which machining is to take place. Said designation may involve on the one hand a temporary surface marking, on the other hand, if necessary in addition to said marking, it may involve the setting up a piece of equipment of a work system, for example a machine or other tool. Depending on the machine class, for example, CNC programming may also be subsumed under this set-up process. The machining may involve, for example, creating a topology or surface profile, a decorative pattern, or a cutout. It is also possible within the scope of the invention to define multiple machining regions on the chipboard with tubes, e.g. at various points on the upper and/or lower face. The user is free to choose whether these machining regions are strictly separate from one another or possibly overlap with one another. Machining can in particular be understood to mean methods that involve machining of the surface, i.e. the upper and/or lower face of the board body. Methods of this kind may for example remove material, e.g. milling, planing, grinding, filing, cutting, or sawing, or the like.

In a further step of the method according to the invention, a foam-forming material is introduced into at least one of the above-mentioned tubes in the machining region in order to locally reduce the difference in density between the tubes and the board body. If, for example, a region in which machining is to take place has been marked on the surface, in this step the tubes located in this region are foamed at least in portions with the foam-forming material. A material of this kind could in particular be small-pored rigid foams, which thus serve to increase the density and thus strength of the board body in the regions weakened by the tubes. Typical foams that are suitable for implementing the invention may have a pore diameter of from 150 µm to 300 µm. The density of the chipboard with tubes can be increased by introducing foam by, for example, approx. 15 wt. % to 35 wt. % relative to the chipboard with tubes without foam, wherein the flexural strength transversely to the board plane in the chipboard with tubes filled with foam-forming material in the machining region is at least 2 times higher than the initial flexural strength of the unfilled chipboard with tubes. The tensile strength parallel to the tubes can be increased by a factor of at least 4 by introducing foam-filling material. The mechanical properties are measured in each case according to EN 14755.

In a further step, the machining regions are machined. With regard to the above-mentioned definition of multiple separate machining regions, within the context of the invention, it is also entirely possible for various machining operations to be carried out in each machining region or even for a combination of different types of machining operation to be carried out in a machining region. In this connection, the machining itself may in turn comprise multiple substeps in order to achieve a machining goal, e.g. the creation of a cutout in conjunction with a profile in the surface of the chipboard with tubes in the edge region of the cutout.

The method according to the invention for foaming chipboard with tubes is highly efficient and creates products of very high quality. The targeted introduction of density-increasing and thus strength-enhancing foam results in a substantial increase in the stability, in particular the tensile and flexural strength of the product. The improved stability makes it possible to machine the surface of a chipboard with tubes or to make a cutout in a chipboard with tubes in a simple and economical manner.

A chipboard with tubes can be provided from a warehouse for further machining according to the method mentioned above. However, the chipboard with tubes may in particular also be used immediately after having been manufactured in a continuously operating process. Thus it is possible, for example, to use a chipboard with tubes that has been cut to length on a cutting zone in a continuously operating process. According to a preferred embodiment, the provided chipboard with tubes were previously produced in an extrusion method.

In a continuously operating process of this kind, for example, sawmill waste wood in the form of classified and prepared lignocellulosic materials, in particular wood chips, that have been glued with binder are scattered into a usually vertical press shaft having lateral, heated guide plates and pressed in cycles by a ram in a tamping cycle, while the chipboard with tubes is being pushed or conveyed downward. During the pressing, heat can additionally be introduced into the material being pressed, such that the binder cures, and after curing the mixture of, for example, wood chips and binder is permanently bonded together. Cylindrical rods or mandrels may also be arranged in the press shaft, on which rods or mandrels the press punch is guided and which also ensure the formation of the tubes in the board body, such that subsequent drilling of holes can be dispensed with. In a tamping method of this kind, the orientation of the chip surfaces of the wood chips is preferably transverse to the tamping direction.

The tubes in the board body in particular offer advantages with respect to the weight of the corresponding chipboard with tubes. In addition, raw material is saved. However, a disadvantage as set out above is that, in particular in the case of machining operations on the chipboard with tubes that remove material from the upper and/or lower face, surface portions can be exposed or created which are only separated from one or more tubes by a thin wall, and/or which partially cut at least one tube, thus exposing a cavity as described above. The more material is removed, for example, from the upper and/or lower face during the machining, the thinner the distance between the upper and/or lower face and the tubes. The machining thus weakens the surface of the board body in the machining region as a result of material-removing machining or the machining completely removes the wall portion above a tube in the machining region. The strength of the machining region thus decreases with increasing material removal by machining. The board is therefore increasingly susceptible to breakage depending on the extent of the machining. In addition, it is often impossible to produce a clean cutting edge in a thin wall portion.

If, during machining on the wall portion toward a tube, such a quantity of material is lost that it results in a gate or even a complete cut with one or more tubes, it is advantageous if at least the affected tubes are foamed in the region of the gate in order to increase the strength. Many forms of machining, in particular those in which the machining region is machined in a uniform manner, require such gates or complete substantially in the edge region of the corresponding machining region. Therefore, according to another preferred embodiment, the foam-forming material is introduced into corresponding tubes in the edge region of the machining region, if necessary exclusively in the edge region of the machining region.

Although material is removed during a possible form of machining, the board body is not penetrated so deeply as to cut directly into the tubes. According to another preferred embodiment, a topology, in particular a decorative pattern or profile, is created in at least one machining region during the machining. A topology of this kind may, for example, be created by means of milling, planing, filing, sawing, cutting, or another chip-removing method both by machine and manually. In particular, the surface may be decorated, for example within the scope of producing country house doors having a profiled surface. As already mentioned above, this may create the problem that the distance between a tube as a cavity and the upper and/or lower face is so small that the thin wall portion in the region above the relevant tube is left filigreed and unstable. This was described above as a region of low compressive strength. Particularly preferably, in this case, the tubes in the entire machining region, i.e. also those which are not located in the edge region, are foamed in order to provide stability to the topology to be created.

As already mentioned, chipboard with tubes are used, in particular, for manufacturing doors or wall elements. Wall elements also include, for example, mobile partition walls or wall elements, in particular non-load-bearing wall elements in interior construction. It may be necessary here, for example for functional and/or aesthetic reasons, to insert structural or decorative components into the future door or wall element, i.e. into the chipboard with tubes. According to another preferred embodiment, a cutout is therefore made in at least one machining region during the machining so as to cut through the upper and lower face of the board body or through the board body as a whole. The edge region of the cutout may preferably coincide with the edge region of the machining region. However, the size of the cutout does not necessarily have to match the size of the defined machining region. As set out above, other machining operations may also be carried out in the same machining region, for example in the edge region of the cutout. Other machining operations of this kind may constitute the creation of a decoration or an edge profile in addition, for example, to a cutout. Particularly preferably, the tubes in such machining regions are foamed in portions at least in the edge region of the cutout, such that the weakening of the edge regions by means of the tubes is at least reduced both dimensionally and statically, and ideally eliminated.

Cutouts in chipboards with tubes are frequently provided for arranging infills, for example transparent viewing elements or solid infills made of wood, metal, ceramics, or plastic. Various transparent components, for example rectangular windows or round windows, such as portholes, may be used as a viewing element of the like described above. In addition, partially or non-transparent glass components may be installed in the cutouts, for example inserts made of frosted glass, which are translucent rather than opaque and which, in addition, have a decorative function. In order to incorporate these into the previously created cutout, according to another preferred embodiment, a frame is arranged in the edge region of the cutout. A frame of this kind in particular serves the purpose of holding or fastening an infill to be arranged in the cutout. The frame is preferably in operative connection, at least in portions, to a foamed portion of a tube. The frame often consists of strips and is glued at least at these points in the chipboard with tubes or fastened by means of other conventional connection means. In particular, the frame may be attached to the board body or the foamed tube in the edge region of the cutout by means of pins (e.g. wooden pins or metal pins). However, it is also clear that the frame may simply consist of a sealant, gasket or adhesive for receiving or holding the infill.

As an alternative to infills of this kind, other components having properties or functions may also be arranged in or at a cutout, for example doors for hatches, pass-throughs, animal flaps, or similar components. According to another preferred embodiment, the cutout is therefore provided with a door after the arrangement of a frame.

Depending on the dimensions of the machining and on the number of different machining operations in a machining region, it may be necessary, in order to achieve the above-mentioned advantages in particular with regard to the increased stability, to foam, in each case in portions, multiple tubes that are spaced apart from one another by one or more tubes arranged between the tubes to be foamed. This applies, in particular, if the tubes to be foamed are arranged on opposing edge regions of a larger machining region spanning multiple tubes. According to another preferred embodiment, the foam-forming material is therefore introduced into a plurality of tubes in each case in portions thereof, wherein said tubes do not have to be adjacent to one another. Said introduction may take place at atmospheric pressure, but it preferably takes place at a pressure of between 3 bar and 15 bar. At an elevated pressure, a tube is foamed in a uniform manner and the foam also forms in a uniform manner.

The thickness of a chipboard with tubes of the type in question is particularly preferably many times smaller than the corresponding width or even the length of the chipboard with tubes. This is particularly clear from the example of a door or wall element to be manufactured therefrom. It can generally be assumed that there are a large number of tubes across the width of a single chipboard with tubes, these tubes usually being oriented in parallel with the longitudinal axis of the chipboard with tubes. The diameter of the tubes is naturally limited by the thickness of the chipboard with tubes and the thin wall portions that in each case terminate one tube with respect to the upper and lower face of a chipboard with tubes. As already set out above, multiple tubes may ultimately be cut at various angles as a result of the machining depending on the size of the machining region and, in particular, within the scope of arranging a cutout in the chipboard with tubes. Therefore, according to another preferred embodiment and with regard to the aforementioned plurality of tubes foamed in portions with foam-forming material, the plurality of tubes is cut in the region of the tube portions filled with foam-forming material when a cutout is created.

The invention further relates to a device that is used to foam a tube of a chipboard with tubes at least in portions. Said device comprises at least one container for receiving the foam-forming material or a container for each component of the foamable material. The device further comprises a mixing and dosing system, comprising a dosing device, e.g. one or more flow meters and a mixing head. The container or containers and the components of the mixing and dosing system are connected by pipes in which the material is conveyed. The material is conveyed by means of at least one pump. If the foam-forming material consists of two or more component, it is conveyed in a line from one container for each component to the mixing head, wherein the amount of the component is defined by means of a dosing device. The two or more components are mixed in the mixing head and the mixed components are then conveyed in a line to a lance. The lance, which is also part of the device, is the free outlet end of the line in a simple embodiment. Preferably, however, the lance is connected to the line at its inlet end. The outlet end of the lance is generally in the tube to be foamed during the foaming procedure, in particular in a machining region of the chipboard with tubes. The lance is sufficiently rigid to be inserted into and removed from the tube to be foamed with ease. The device is usually supplemented with a control unit, which, on the one hand, controls the mixing and dosing system by specifying the amount of foam-forming material to be dispensed or of the individual components thereof. On the other hand, the control unit optionally also comprises the control of the lance, e.g. by a robot. The control unit in particular specifies the penetration depth in the tube to be foamed and the speed of the lance in the tube to be foamed during foaming. Optionally, the control unit also controls the pressure at which the material to be foamed is introduced into the tube to be foamed. The foaming may take place at atmospheric pressure. Preferably, the container(s), the mixing head, and the lance are designed such that the control unit can effect the foaming at a pressure of 3 bar to 15 bar.

The invention further relates to a chipboard with tubes, wherein definitions and explanations regarding terminology relating to the aforementioned method according to the invention also apply here.

According to the invention, the chipboard with tubes comprises a board body traversed by tubes and having surfaces, namely an upper and a lower face, wherein one or more tubes are foamed with a foam-forming material in portions in at least one machining region, and wherein the machining regions each have a cutout and/or a topology, in particular a decorative profile, on at least one surface. Within the context of the invention, it is conceivable for a cutout and one or more topologies, e.g. adjacent to the cutout, to be arranged in a machining region. Equally, it is also possible that two or more cutouts independent of each other are arranged in a machining region, which cutouts are additionally provided with a topology, if applicable.

In addition, according to a preferred development, a frame is also arranged in the edge area of those processing areas that have a cut-out, which frame covers the cut, foamed tubes at least in sections. The frame may be produced from strips, but it may also consist of a layer of material, a tape, or a film that covers the cut portions of the chipboard with tubes. As described above in connection with the method, an infill is optionally arranged in a cutout and, if applicable, framed or secured by the frame.

According to another preferred embodiment, a door is inserted in a cutout. It is possible to adapt said door to the field of application, such that, in the medical field for example, it is designed as an airlock that is accessible from both sides for the exchange of objects with a clean room or the like. In simpler cases, the door may also be designed as a slot having a flap for a mailbox. The possibility of designing the door as a dog or cat flap has already been mentioned above. In all such cases, it may thus be advantageous if the door is arranged and fastened on the edge of portions of the chipboard with tubes that are as stable and strong as possible. Here, in particular, the foaming of chipboard with tubes at least in portions, in particular in the edge region of a machining region, is shown to bring significant advantages.

In order to make these advantages possible, according to another preferred embodiment, the foam-forming material has a density of at least 20%, preferably 25% that of the board body. The foam-forming material fills an empty tube and thus offers the possibility, for example, of anchoring a frame of the above-mentioned type, which is to be arranged in the region of said tube, to the foam-forming material. Two-component materials are often used as the foam-forming material, wherein the two components react with one another immediately after being mixed with the release of gas, which then produces a foam that foams a tube of a chipboard with tubes. A typical material may consist of a combination of isocyanate and polyol in a quantitative ratio of 1:1 to 1:2, preferably 1:1.5.

In addition to the density of the foam-forming material, the strength can also be an important factor with regard to the creation of a topology, in particular. Here, the foam-forming material is intended to have a supporting effect, for example in the case of a thin wall portion of the like as described above that is formed above a tube. It is known from physical laws that density and strength do not necessarily go hand in hand. According to another preferred embodiment, the strength in the region of the foamed tube is greater than the strength of the non-foamed tube. As such, the flexural strength increases parallel to the direction of the tube by a factor of at least 2, preferably a factor of at least 3, compared to the non-foamed tube. The tensile strength increases after foaming by a factor of at least 4, advantageously by a factor of at least 5, relative to the non-foamed tube. The mechanical properties were measured in each case in accordance with DIN 14775.

BRIEF DESCRIPTION OF THE DRAWINGS

Details of the invention are explained below using an exemplary embodiment with reference to the figures, in which.

DETAILED DESCRIPTION

Figure 1:
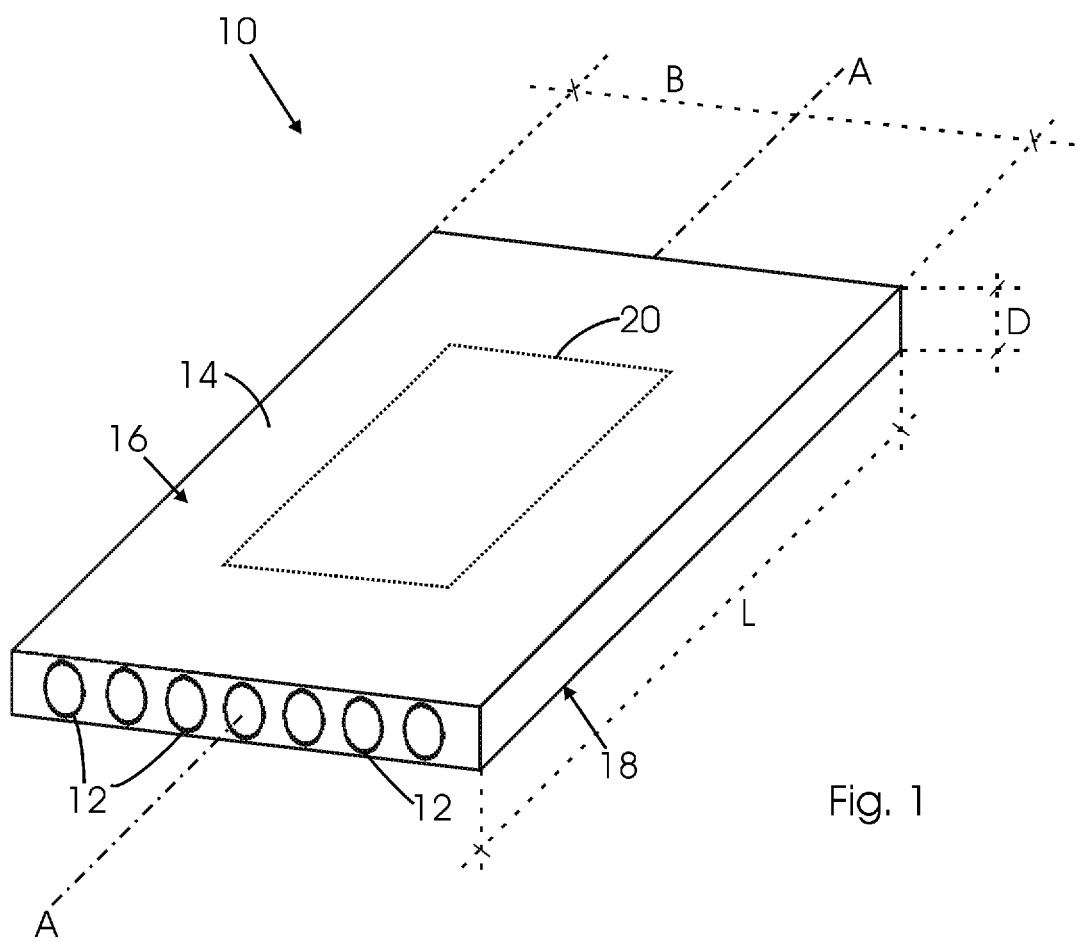
FIG. 1 is a perspective view of a chipboard with tubes having a defined machining region according to one embodiment.

FIG. 1 shows an example of a chipboard with tubes 10 having a board body 14 traversed by tubes 12. The board body 14 consists of chips mixed with binders and that were pressed in an extrusion process under pressure and heat and cut to the specified length. The width of the chipboard with tubes 10 is predetermined by the manufacturing method. The chipboard with tubes 10 in this case has a length L, a thickness D, and a width B, by way of example. The tubes 12 extend along the length L and thus in parallel with a longitudinal axis A of the board body 14. The board body 14 comprises an upper face 16 and a lower face 18, wherein a machining region 20 was defined on the upper face 16.

Figure 2A:
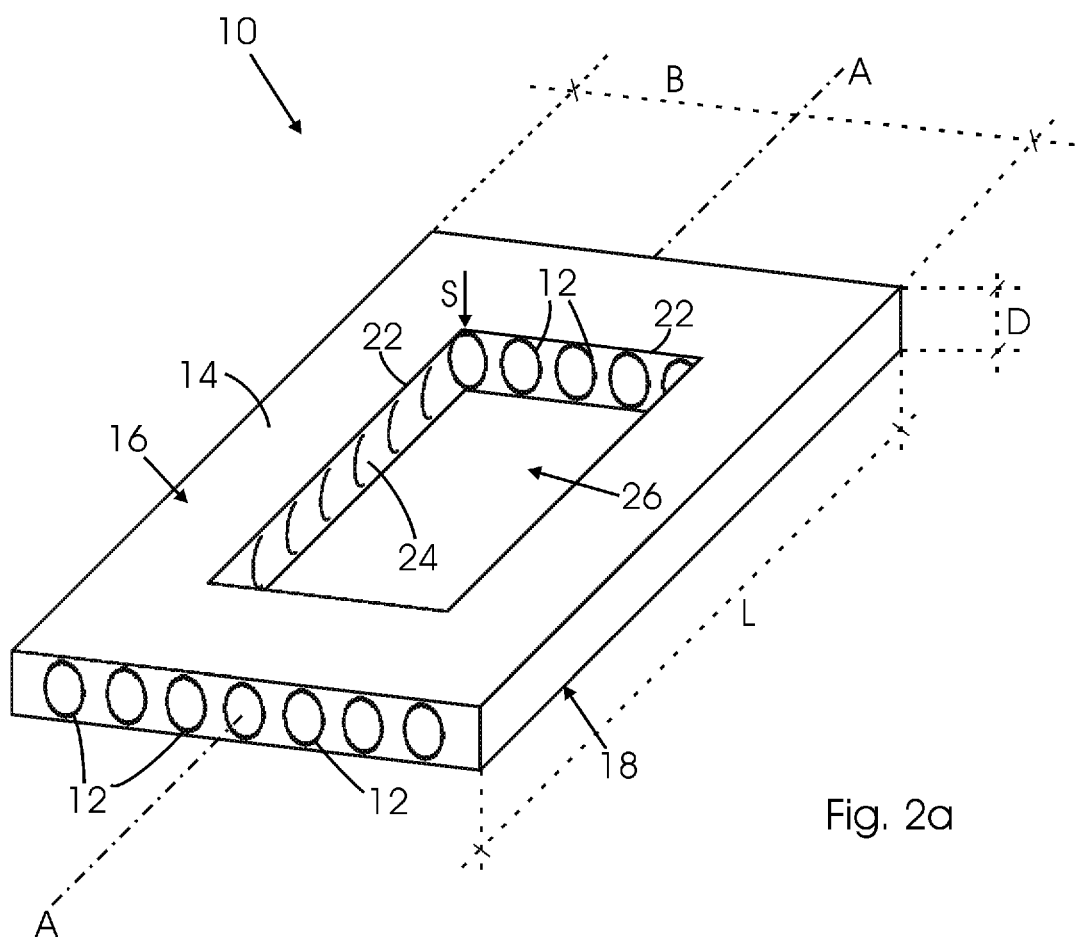
FIG. 2a is a perspective view of the chipboard with tubes from FIG. 1 with a cutout in the machining region.

FIG. 2a illustrates the embodiment of the chipboard with tubes 10 according to FIG. 1 after machining, in this case the creation of a cutout 26. The cutout 26 extends in a cut direction S, which in this case is oriented perpendicularly to the upper face 16, and penetrates the chipboard with tubes 10 completely, i.e. both the upper face 16 and the lower face 18. The cutout 26 cuts through a plurality of tubes 12 both in the direction of the longitudinal axis A and transversely thereto. The cutout 26 accordingly comprises an edge region 22, in which the board body 14 and the tubes 12 are cut either in the direction of the longitudinal axis or transversely thereto. FIG. 2a in particular illustrates how a concave recess 24 is left behind in the portions of the edge region 22 in which the tubes are cut in parallel with the longitudinal axis A. In contrast, the tubes 12 which are cut transversely to the longitudinal axis A by the cutout 26 have substantially the same characteristics as the tubes 12 on the free longitudinal ends of the chipboard with tubes 10.

Figure 2B:
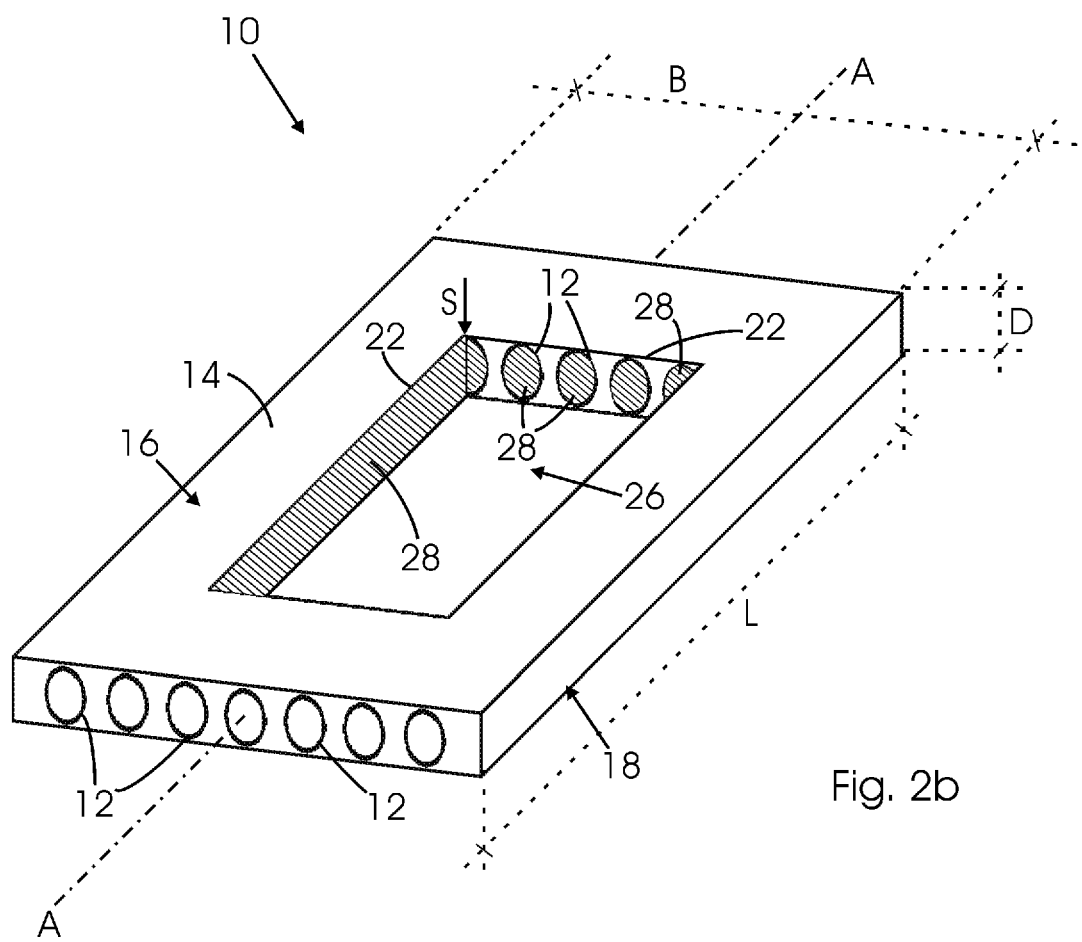
FIG. 2b is a perspective view of a chipboard with tubes according to the invention with a cutout and tubes that are foamed in portions.

FIG. 2b shows a chipboard with tubes 10 of the like illustrated by way of example in FIG. 2a, wherein the disadvantages of the aforementioned recess 24 have been improved according to the invention, in particular by means of foams 28 at least in portions. As shown in FIG. 2b, the former recess 24 now has a substantially planar cut surface parallel to the longitudinal axis A on account of the foam 28. Equally, the tubes 12 that are cut by the cutout 26 transversely to the longitudinal axis are no longer open in the corresponding edge region 22, but rather have also been provided with foam 28. Here, the foam 28 was in each case arranged prior to the machining for the cutout 26 and, more specifically, already when the corresponding machining region was defined. As described above, a mental definition is sufficient; a visible or tactile marking according to FIG. 1 is not absolutely necessary.

Figure 3A:
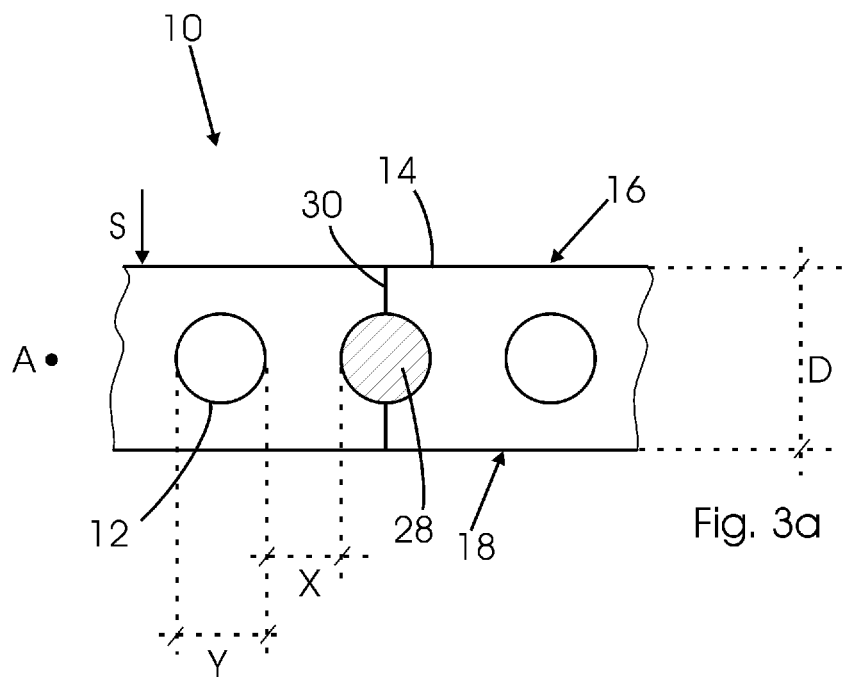
FIG. 3a is a normal view along a longitudinal axis of part of a chipboard with tubes prior to machining.
Figure 3B:
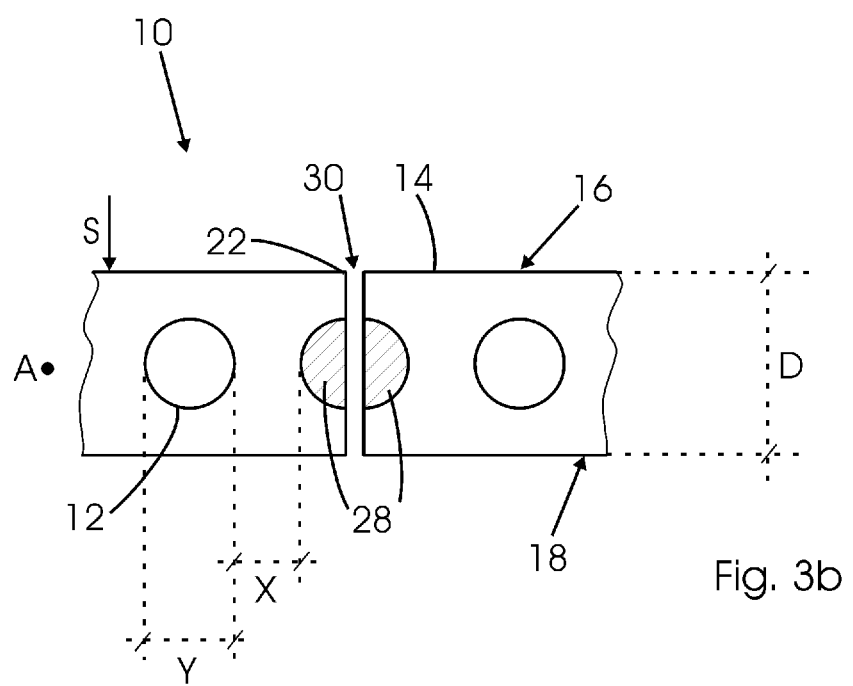
FIG. 3b shows the chipboard with tubes from FIG. 3a after machining.

FIG. 3a shows an example of a portion of a chipboard with tubes 10 having three tubes 12 arranged at a distance X from one another and each having a tube diameter Y. It is clear that only the tubes 12 which are arranged in the region of a cut line 30, or which are cut thereby, comprise foam 28. If a tube 12 is at a sufficient distance from the future edge region 22 (FIG. 3b), said tube does not have to be provided with foam 28.

In a simple embodiment, the method according to the invention is carried out in such a way that a foam-forming material, e.g. a mixture of an isocyanate and a polyol in a ratio of 1:1.5 is introduced into a tube 12 of the chipboard with tubes 10, preferably at temperatures of between 10° C. and 40° C., for example by means of a lance that projects into the tube 12 to be foamed up to or into the machining region 20. At the inlet end, the lance is connected via a fluid line to a mixing and dosing system, in which the above-mentioned two-component mixture of isocyanate and polyol is metered, preferably by means of flow meters, and is mixed in a mixing head for immediate use. The mixing and dosing system is typically equipped with a container having a stirrer for each of the components of the foam-forming material, with pumps, flow meters, a mixing head, and with lines that connect the individual components of the mixing and dosing system to one another. The material or the components thereof are conveyed out of the containers in accordance with the respective flow meters by means of one or more pumps and through the mixing head to the outlet end of the lance. In this simple embodiment, the lance can be guided by hand. The length of the lance is approx. 2 m to 3 m. A typical mixing and dosing system dispenses approx. 20 g/second to 100 g/second of foam-forming material. In order to continuously produce this dispensing amount in the case of a two-component material, two containers each with a volume of approx. 200 l are required in order to stock one constituent of the material each. The stirrer ensures uniform dispensing of the relevant component at a consistent quality. The foam-forming material is introduced into the tube 12 to be foamed immediately after the two components have been mixed in the mixing head and foams in said tube after the lance has exited, as a result of which the tube 12 is filled with foam at least in portions. The foam-forming material exits the outlet end of the lance at a high pressure. High pressure should be understood in this case to mean outlet pressures of between 3 bar and 15 bar. The dwell time of the foam-forming material in the lance prior to being introduced into a tube 12 is therefore short in the high-pressure method presented above. This in particular has the advantage that the device can be used for longer in the case of a multi-component foam-forming material on account of the reduced need for cleaning and maintenance. Since only the mixture of the corresponding components, i.e. the material, is chemically rapidly reactive, in most cases only the lance has to be cleaned after production has been interrupted. In an alternative embodiment, in particular in procedures in which a slow-reacting material is used, it is also conceivable for the material to be introduced into a tube 12 of a chipboard with tubes 10 at a lower pressure, at a low pressure, from the lance.

In the case of longer tubes 12, e.g. for doors or wall elements, the foaming is preferably done in two steps. In a first step, the lance is introduced from a first end of the tube 12 and the tube 12 is foamed at least in portions from the center up to the first end of the tube 12. In a second step, the lance is then introduced from the opposing second end of the tube 12 and the tube 12 is foamed at least in portions between the center of the chipboard with tubes 10 and the second end. The foam-forming material is usually liquid until it leaves the lance, in particular if a high-pressure method is used, and foams up after leaving the lance. Preferably, a foam having a pore size of from 150 μm to 300 μm is produced. It usually takes approx. 15 minutes for the tube 12 to fill with foam.

According to an advantageous embodiment of the method, multiple chipboard with tubes 10 are processed at the same time. In this case, two or more lances are used at the same time. Preferably, a control unit is used, which controls individual lances or groups of lances in order to be able to foam each individual tube 12 at least in portions in accordance with the control unit even in the case of simultaneous foaming of multiple chipboard with tubes 10 or multiple tubes 12 in one or more chipboard with tubes 10. The control unit may preferably control and/or regulate the penetration depth of the lance into the tube and, if applicable, also the amount of foaming material introduced into the tube 12. A control unit is also understood to mean a robot that handles the lance.

According to another advantageous embodiment of the method, a conveyor belt or turntable may be used in order to foam one or more tubes 12 of a chipboard with tubes 10 at least in portions. In particular, if robots are used to guide the lance, it has proven advantageous to use a conveyor belt or turntable in order to be able to quickly process the chipboard with tubes 10, in which at least one tube 12 is to be foamed at least in portions. In particular, a conveyor belt or turntable on which a stack of chipboard with tubes 10 is layered one on top of the other has proven to be useful. One or more tubes 12 of the layered chipboard with tubes 10 may be foamed at least in portions one after the other or at the same time by a lance or a group of lances.

According to another preferred embodiment of the method, the conveyor belt or turntable are designed such that they can be tilted or inclined, preferably at an angle of up to 10°, preferably up to 5°, proceeding from a horizontal position. If a chipboard with tubes 10 is inclined when foaming material is being introduced, the distribution of the material in the relevant tube 12 to be foamed can be optimized. For example, the lance can be designed to be shorter, because the distribution or flow of the material can be utilized in order to foam portions of the tube 12 that are far inside the chipboard with tubes 10. As such, the shorter lance can be introduced into the tube 12 and taken out again faster, which results in faster processing.

Optionally, the conveyor belt or turntable may be equipped with a film-wrapping device for the chipboard with tubes 10 having at least partially foamed tubes 12. As a result, the chipboard with tubes 10 are protected for transportation if the chipboard with tubes 10 are transported after foaming but prior to machining. In the case that the tube(s) 12 are foamed up to the edge of the chipboard with tubes 10, the foam is prevented from escaping from a tube 12 if said chipboard is wrapped in film. Furthermore, this effectively prevents the end faces from becoming soiled and the boards 10 sticking to one another due to any escaping foam.

According to another advantageous embodiment, a mixing or dosing system having the associated lance or lances and a control unit may also be arranged with two conveyor belts or turntables, since the time for orienting the new stack and, if applicable, for wrapping the processed stack in film can then be used to process a stack of chipboard with tubes 10 arranged on a second conveyor belt or turntable.

In addition, strength properties of a non-foamed tube 12 (before) and a foamed tube 12 (after) were determined. The following values were determined according to EN 14755: the flexural strength in the region of the tube 12 parallel to the tube 12 was 1.48 N/mm² prior to foaming and 4.07 N/mm² after foaming. The tensile strength in the region of the tube 12 was 0.46 N/mm² prior to foaming and after foaming the tensile strength in the region of the tube 12 was 2.27 N/mm². On account of the foaming of the tube 12, the density of the chipboard with tubes 10 increases from an average of 259 kg/m³ to 334 kg/m³.

The above-described aforementioned device and method features can each be freely and individually combined in order to optimize work.

LIST OF REFERENCE SIGNS

10 Chipboard with tubes
12 Tube
14 Board body
16 Upper face
18 Lower face
20 Machining region
22 Edge region
24 Recess
26 Cutout
28 Foam
30 Cut line
A Longitudinal axis
B Width
D Thickness
L Length
S Cut direction
X Distance between tubes
Y Tube diameter

The invention claimed is:

1. A method for foaming chipboards with tubes (10) comprising a board body (14) interspersed by tubes (12) and having surfaces comprising an upper face and a lower face (16, 18), said method comprising the steps of
providing a chipboard with tubes (10),
defining one or more machining regions (20) on the upper face and/or the lower face (16, 18) of the chipboard with tubes (10), introducing a foam-forming material into at least one of the above-mentioned tubes (12) in the machining region (20) in order to locally reduce the difference in density between the tubes (12) and the board body (14), machining the machining regions (20).

2. The method according to claim 1, wherein the foam-forming material is introduced into corresponding tubes (12) at least in the edge region (22) of the machining region (20).

3. The method according to claim 1, wherein a topology is created in at least one machining region (20) during the machining.

4. The method according to claim 3, wherein the topology is a decorative pattern.

5. The method according to claim 1, wherein a cutout (26) which penetrates the upper and lower face (16, 18) of the board body (14) is made in at least one machining region (20).

6. The method according to claim 5, wherein a frame is arranged in the edge region (22) of the cutouts (26).

7. The method according to claim 6, wherein the cutout (26) is filled with an infill after the arrangement of a frame.

8. The method according to claim 1, wherein the foam-forming material is introduced into a plurality of tubes (12) in each case in portions thereof.

9. The method according to claim 8, wherein, on account of the creation of a cutout (26), the plurality of tubes (12) are cut in the region of the portions that are filled with foam-forming material.

\* \* \* \* \*